United States Patent
Zeiss et al.

(10) Patent No.: US 11,964,453 B2
(45) Date of Patent: Apr. 23, 2024

(54) LAMINATED PANE WITH ELECTRICALLY CONTROLLABLE OPTICAL PROPERTIES AND LAMINATED PANE ASSEMBLY

(71) Applicant: SAINT-GOBAIN GLASS FRANCE, Courbevoie (FR)

(72) Inventors: Michael Zeiss, Heinsberg-Haaren (DE); Stefan Uebelacker, Würselen (DE); Laurent Lamoureux, Montmort-Lucy (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 520 days.

(21) Appl. No.: 17/297,300

(22) PCT Filed: Jan. 9, 2020

(86) PCT No.: PCT/EP2020/050392
§ 371 (c)(1),
(2) Date: May 26, 2021

(87) PCT Pub. No.: WO2020/156773
PCT Pub. Date: Aug. 6, 2020

(65) Prior Publication Data
US 2022/0024187 A1 Jan. 27, 2022

(30) Foreign Application Priority Data

Jan. 30, 2019 (EP) .................... 19154492

(51) Int. Cl.
*B32B 17/10* (2006.01)
*B60J 3/04* (2006.01)
(Continued)

(52) U.S. Cl.
CPC .. *B32B 17/10504* (2013.01); *B32B 17/10036* (2013.01); *B32B 17/10174* (2013.01);
(Continued)

(58) Field of Classification Search
CPC ........ B32B 17/10504; B32B 17/10036; B32B 17/10174; B32B 17/10348;
(Continued)

(56) References Cited

U.S. PATENT DOCUMENTS

| 10,525,673 B2 | 1/2020 | Weber et al. |
| 2005/0001456 A1 | 1/2005 | Bohm et al. |

(Continued)

FOREIGN PATENT DOCUMENTS

| CN | 102365698 A | 2/2012 |
| CN | 204244214 U | 4/2015 |

(Continued)

OTHER PUBLICATIONS

International Search Report as issued in International Patent Application No. PCT/EP2020/050392, dated Mar. 17, 2020.

*Primary Examiner* — William Choi
(74) *Attorney, Agent, or Firm* — Pillsbury Winthrop Shaw Pittman LLP

(57) ABSTRACT

A laminated pane with electrically controllable optical properties, includes an outer pane and an inner pane that are joined to one another via a thermoplastic intermediate layer, wherein an optoelectronic functional element with electrically controllable optical properties is incorporated into the intermediate layer, including an active layer, to which transparent sheetlike control electrodes are assigned on both surfaces, between a first carrier film and a second carrier film, wherein the intermediate layer, which surrounds the optoelectronic functional element, and the carrier films contain, in each case, thermoplastic material, wherein at least one capacitive touch element is integrated into the optoelectronic functional element such that a portion of at least one control electrode of the optoelectronic functional (Continued)

Figure 1:
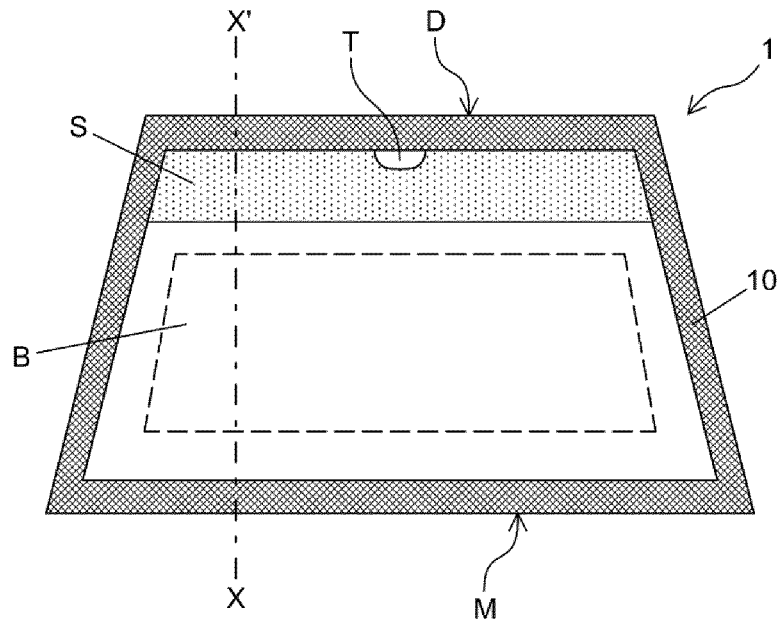

element is separated and provided with a signal lead for detecting a capacitive touch or approach signal.

15 Claims, 2 Drawing Sheets

(51) Int. Cl.
  *E06B 3/67* (2006.01)
  *E06B 9/24* (2006.01)
(52) U.S. Cl.
  CPC .......... *B32B 17/10348* (2013.01); *B60J 3/04* (2013.01); *E06B 3/6722* (2013.01); *E06B 9/24* (2013.01); *B32B 17/10532* (2013.01); *B32B 2605/006* (2013.01)
(58) Field of Classification Search
  CPC .......... B32B 17/10532; B32B 2605/006; B60J 3/04; E06B 3/6722; E06B 9/24
  USPC .................................................. 359/265–275
  See application file for complete search history.

(56) References Cited

U.S. PATENT DOCUMENTS

| | | | |
|---|---|---|---|
| 2015/0331298 A1 | 11/2015 | Yagi | |
| 2016/0154290 A1 | 6/2016 | Brown et al. | |
| 2019/0179458 A1* | 6/2019 | Weber | B32B 17/1022 |

FOREIGN PATENT DOCUMENTS

| | | |
|---|---|---|
| CN | 106457779 A | 2/2017 |
| CN | 106664089 A | 5/2017 |
| CN | 107848378 A | 3/2018 |
| CN | 109073928 A | 12/2018 |
| DE | 10 2005 007427 A1 | 8/2006 |
| DE | 10 2005 049081 B3 | 6/2007 |
| DE | 10 2007 027296 A1 | 12/2008 |
| DE | 10 2008 026339 A1 | 12/2009 |
| DE | 10 2013 001334 A1 | 7/2014 |
| EP | 0 876 608 B1 | 4/2002 |
| EP | 1 493 557 A1 | 1/2005 |
| JP | S60-168128 U | 11/1985 |
| JP | H06-160118 A | 6/1994 |
| JP | 2002-067690 A | 3/2002 |
| JP | 2010-521353 A | 6/2010 |
| JP | 2015-529183 A | 10/2015 |
| JP | 2017-159730 A | 9/2017 |
| JP | 2018-509361 A | 4/2018 |
| JP | 2018-537697 A | 12/2018 |
| JP | 2019-515841 A | 6/2019 |
| JP | 2021-522148 A | 8/2021 |
| KR | 10-2017-0097135 A | 8/2017 |
| KR | 10-2018-0059531 A | 6/2018 |
| WO | WO 2008/113978 A1 | 9/2008 |
| WO | WO 2011/033313 A1 | 3/2011 |
| WO | WO 2013/053629 A1 | 4/2013 |
| WO | WO 2014/121809 A1 | 8/2014 |
| WO | WO 2015/193745 A1 | 12/2015 |
| WO | WO 2016/116372 A1 | 7/2016 |
| WO | WO 2017/029384 A1 | 2/2017 |
| WO | WO 2017/157626 A1 | 9/2017 |
| WO | WO 2018/188844 A1 | 10/2018 |
| WO | WO 2019/206772 A1 | 10/2019 |
| WO | WO 2021/037551 A1 | 3/2021 |

* cited by examiner

LAMINATED PANE WITH ELECTRICALLY CONTROLLABLE OPTICAL PROPERTIES AND LAMINATED PANE ASSEMBLY

CROSS-REFERENCE TO RELATED APPLICATIONS

This application is the U.S. National Stage of PCT/EP2020/050392, filed Jan. 9, 2020, which in turn claims priority to European patent application number 19154492.3 filed Jan. 30, 2019. The content of these applications are incorporated herein by reference in their entireties.

The invention relates to a laminated pane with electrically controllable optical properties and to a laminated pane assembly that includes such a laminated pane.

Electro-optical functional elements with electrically controllable optical properties have long been known in great variety and are used in industrial mass production, for example, in TV sets, laptops, mobile phones/smart phones, and tablets.

Touch-sensitive displays, in particular in the form of known touchscreens, have also become economical mass-produced products and are now used in smart phones and tablet computers virtually daily by everyone. Their function is based on the fact that touching them with at least one finger results in a local change in resistance, capacitance, or inductance within the display screen structure that can be converted into a switching or control signal, at a signal output of the screen. There are touchscreens of each of the types mentioned that are ready for practical use and are also used in series products; however, by now, so-called "projected capacitive touch" (PCT) screens, wherein the sensor surface is attached to the back of a cover glass and which, consequently, have a particularly simple and wear-free structure, are the most widely used. The ease of implementation of a multitouch function also plays a significant role for smart phones and tablet computers.

Laminated panes with electrically controllable functional elements are also known per se. The optical properties of the functional elements can be changed by an applied electrical voltage. SPD functional elements (suspended particle device), known, for example, from EP 0876608 B1 and WO 2011033313 A1, are an example of such functional elements. The transmittance of visible light through SPD functional elements can be controlled by the voltage applied. PDLC functional elements (polymer dispersed liquid crystal), known, for example, from DE 102008026339 A1, are another example. The active layer contains liquid crystals incorporated in a polymer matrix. When no voltage is applied, the liquid crystals are aligned in a disorderly manner, resulting in strong scattering of the light passing through the active layer. When voltage is applied to the flat electrodes, the liquid crystals align themselves in a common direction and the transmittance of light through the active layer is increased.

SPD and PDLC functional elements are commercially available as multilayer films in which the active layer and the flat electrodes required for applying voltage are arranged between two carrier films, typically made of PET. In the production of the laminated pane, the functional element is cut from the multilayer film in the desired size and shape and inserted between the films of an intermediate layer by means of which two glass panes are laminated to one another to form the laminated pane.

Windshields have been proposed in which an electrically controllable sun visor is implemented by means of such a functional element to replace the conventional mechanically pivotable sun visor in motor vehicles. Windshields with electrically controllable sun visors are known, for example, from DE 102013001334 A1, DE 102005049081 B3, DE 102005007427 A1, and DE 102007027296 A1.

WO 2018/188844 A1 of the applicant discloses, albeit rather marginally, controlling a functional element (specifically a sun visor) embedded in a laminated pane by means of a capacitive button arranged in the area of the functional element. WO 2017/029384 A1, also originating with the applicant, proposes a laminated pane, wherein a touch switching function (or even a contactless switching function when a finger approaches the pane) is realized by a capacitive switching element integrated in the pane. In the latter publication, this function is implemented in connection with a so-called "low-E coating" of the laminated pane, i.e., a coating that reflects incident solar radiation or reduces the emission of longwave IR radiation from a heated pane into a vehicle interior.

The object of the present invention is to provide an improved laminated pane with electrically controllable optical properties that has a largely conventional structure and can thus be easily and economically produced and nevertheless enables realizing switching and control functions in a manner that is modern and appealing to the user.

The object of the present invention is accomplished by a laminated pane in accordance with the independent claim 1. Preferred embodiments emerge from the dependent claims.

The laminated pane according to the invention comprises at least an outer pane and an inner pane that are joined to one another via an intermediate layer. The laminated pane is intended, in a window opening, for example, of a vehicle, of a building, or of a room, to separate the interior from the external environment. In the context of the invention, "inner pane" refers to the pane facing the interior. "Outer pane" refers to the pane facing the external environment. The thermoplastic intermediate layer serves to join the two panes, as is customary with laminated panes.

The outer pane and the inner pane are preferably made of glass. However, in principle, they can also be made of plastic. The thickness of the outer pane and the inner pane can vary widely and thus be adapted to the requirements of the individual case. The outer pane and the inner pane preferably have thicknesses from 0.5 mm to 5 mm, particularly preferably from 1 mm to 3 mm. The panes can be clear, or even tinted, or colored as long as the windshield has, in the central field of vision, sufficient light transmittance, preferably at least 70% in the main through-vision region A per ECE-R43.

The outer pane, the inner pane, and/or the intermediate layer can have other suitable coatings known per se, for example, anti-reflective coatings, nonstick coatings, anti-scratch coatings, photocatalytic coatings, or solar protection coatings or low-E coatings.

The laminated pane according to the invention contains an electro-optical functional element with electrically controllable optical properties that is incorporated into the intermediate layer. The functional element is arranged between at least two layers of thermoplastic material of the intermediate layer, being joined to the outer pane by the first layer and to the inner pane by the second layer.

The functional element includes at least one active layer that is arranged between a first carrier film and a second carrier film. The active layer has the variable optical properties that can be controlled by an electrical voltage applied to the active layer. In the context of the invention, "electrically controllable optical properties" means properties that can be continuously controlled, but also properties that can be switched between two or more discrete states. Said optical properties relate, in particular, to the light transmittance and/or the scattering behavior. The functional element also includes flat electrodes (hereinafter also: control electrodes) for applying the voltage to the active layer, which are preferably arranged between the carrier films and the active layer.

In a preferred embodiment, the functional element is a PDLC functional element. The active layer of a PDLC functional element contains liquid crystals that are incorporated into a polymer matrix. In another preferred embodiment, the functional element is an SPD functional element. In that case, the active layer contains suspended particles, with the absorption of light by the active layer being variable by means of application of a voltage to the flat electrodes. In principle, it is, however, also possible to use other types of controllable functional elements, for example, electrochromic functional elements. The controllable functional elements mentioned and their mode of operation are known per se to the person skilled in the art such that a detailed description can be dispensed with here.

The flat electrodes and the active layer are typically arranged substantially parallel to the surfaces of the outer pane and the inner pane. The flat electrodes are electrically connected to an external voltage source in a manner known per se. The electrical contacting to the control voltage supply is realized by suitable connecting conductors, for example, foil conductors, that are optionally connected to the flat electrodes via so-called bus bars, for example, strips of an electrically conductive material or electrically conductive imprints. The thickness of the functional element is, for example, from 0.4 mm to 1 mm.

The flat electrodes are preferably designed as transparent, electrically conductive layers. The flat electrodes preferably contain at least a metal, a metal alloy, or a transparent conductive oxide (TOO). The flat electrodes can contain, for example, silver, gold, copper, nickel, chromium, tungsten, indium tin oxide (ITO), gallium-doped or aluminum-doped zinc oxide, and/or fluorine-doped or antimony-doped tin oxide. The flat electrodes preferably have a thickness of 10 nm to 2 µm, particularly preferably from 20 nm to 1 µm, most particularly preferably from 30 nm to 500 nm.

Provision is made according to the invention, while using the conventional functional element structure, in particular the existing flat electrodes or control electrodes, to also implement a touch or approach detection element in the laminated pane, which is also referred to hereinafter in accordance with its function as a touch element and also, with reference to the physical operating principle, as a PCT element. For this purpose, a portion of at least one of the flat electrodes is separated from the remaining part and is provided with a signal connection line, via which a change in capacitance in the separated switching element section caused by touch/approach can be detected.

The (exclusive) use of the existing flat electrodes of the electro-optical functional element enables particularly simple and economical implementation of the switching function, independently of any additional pane coatings of the low-E type (or others).

The functional element is, in particular, a multilayer film with two outer carrier films. In such a multilayer film, the flat electrodes and the active layer are typically arranged between the two carrier films. Here, the expression "outer carrier film" means that the carrier films form the two surfaces of the multilayer film. As a result, the functional element be provided as a laminated film that can advantageously be further processed. The carrier films advantageously protect the functional element against damage, in particular corrosion.

For such a prefabricated functional element film, the invention can be easily realized, in particular with proven methods of laser patterning. In this way, one or more areas of the multilayer film preconfigured for a specific functional element can be provided with one or more PCT elements by one or more separating lines in (at least) one of the flat electrodes.

It is noted that it is, of course, within the scope of the invention to switch or control a function or a parameter of that electro-optical functional element in which the touch element is arranged, via the touch element. However, the invention is not limited to this; rather, functions other than those of the spatially assigned electro-optical functional element can also be designed or controlled with this element.

The laminated pane is preferably provided as a window pane, particularly preferably as a window pane of a vehicle, in particular of a motor vehicle, of a building, or of a room. In a particularly advantageous embodiment, the laminated pane is the windshield of a motor vehicle, in particular of a passenger car, with an electrically controllable sun visor implemented by the functional element. Whereas the side edges and the upper edge of such a functional element are typically concealed by the customary masking print in the edge region of the pane, the lower edge is arranged in the through-vision region of the pane and is thus not masked and is visible. This lower edge of the functional element is preferably sealed according to the invention. The visually inconspicuous seal is particularly advantageous here.

An electrically controllable sun visor can make the conventional mechanically pivotable sun visor superfluous. As a result, space is gained in the passenger compartment of the vehicle, the weight of the vehicle is reduced, and the risk of collision with the sun visor in the event of hard braking or an accident is avoided. In addition, electrical control of the sun visor may be perceived as more convenient than pivoting it down mechanically.

The windshield has an upper edge and a lower edge as well as two side edges extending between the upper edge and the lower edge. The term "upper edge" refers to that edge which is intended, in the installed position, to point upward. The term "lower edge" refers to that edge which is intended, in the installed position, to point downward. The upper edge is also often referred to as the "roof edge"; the lower edge, as the "engine edge". The edges of the functional element are referred to according to the installed position of the windshield. The lower edge of the functional element is thus the one of its side edges that faces away from the upper edge of the windshield and toward the central field of vision. The upper edge of the functional element faces the upper edge of the windshield. The side edges extend between the upper edge and the lower edge.

Windshields have a central field of vision whose optical quality is subject to high requirements. The central field of vision must have high light transmittance (typically greater than 70%). Said central field of vision is, in particular, that field of vision that is referred to by the person skilled in the art as the field of vision B, vision region B, or zone B. The field of vision B and its technical requirements are specified in Regulation No. 43 of the Economic Commission for Europe of the United Nations (UN/ECE) (ECE-R43, "Uniform Provisions Concerning the Approval of Safety Glazing Materials and Their Installation on Vehicles"). The field of vision B is defined there in Annex 18.

The functional element is arranged above the central field of vision (field of vision B). This means that the functional element is arranged in the region between the central field of vision and the upper edge of the windshield. The functional element need not cover the entire region but is positioned completely within this region and does not protrude into the central field of vision. In other words, the functional element is a shorter distance from the upper edge of the windshield than the central field of vision. Thus, the transmittance of the central field of vision is not adversely affected by the functional element, which is situated at a position similar to that of a conventional mechanical sun visor in the downward pivoted state.

From the point of view of the driver (or even occupants) of a vehicle, the invention has particular appeal in conjunction with a sun visor function in the laminated pane. Specifically, a touch element integrated into the sun visor section of the laminated pane is perceived as a reasonable and pleasant option for controlling the sun visor function. Such a design is, consequently, likely to enjoy high user acceptance and is likely to be positively received by the market. Depending on the specific design of the touch element, it can trigger ON/OFF switching of the sun visor function or even gradual dimming/brightening.

In a preferred embodiment, the lower edges of the functional element and of the tinted region of the thermoplastic layer are adapted to the shape of the upper edge of the windshield, resulting in a visually more attractive appearance. Since the upper edge of a windshield is typically curved, in particular concavely curved, the lower edge of the functional element and of the tinted region is also preferably curved. Particularly preferably, the lower edges of the functional element are designed substantially parallel to the upper edge of the windshield. However, it is also possible to construct the sun visor from two halves, straight in each case, arranged at an angle relative to one another and forming a V, approximating the shape of the upper edge.

In an advantageous further development of the invention, the functional element can be divided into segments by isolating lines. The isolating lines can, in particular, be introduced into the flat electrodes such that the segments of the flat electrode are electrically isolated from one another. The individual segments are connected to the voltage source independently of one another such that they can be controlled separately. Thus, different regions of the sun visor can be switched independently. Particularly preferably, the isolating lines and the segments are arranged horizontally in the installed position. Thus, the height of the sun visor can be controlled by the user. Here, the term "horizontally" is to be interpreted broadly and means a propagation direction, running between the side edges of the windshield.

The isolating lines need not necessarily be straight but can, instead, also be slightly curved, preferably adapted to any curvature of the upper edge of the windshield, in particular substantially parallel to the upper edge of the windshield. Vertical isolating lines are, of course, also conceivable. The isolating lines have, for example, a width of 5 μm to 500 μm, in particular 20 μm to 200 μm. The width of the segments, i.e., the distance between adjacent isolating lines, can be suitably selected by the person skilled in the art in accordance with the requirements of the individual case. Already laminated multilayer films can still be segmented later using laser ablation, as mentioned above in connection with the production of the switching element.

In connection with a segmented functional element, specifically a sun visor with multiple visor sections, a multipart touch element or a plurality of such detection elements can also be provided. For this purpose, either one switching element can be placed in each case in individual segments of the optoelectronic functional element or multiple switching elements are placed together in one of the functional element segments. In both cases, the various segments can be switched or controlled separately in a manner that is convenient and easily understood by the user.

When looking through the windshield, the upper edge and the side edges of the functional element are preferably covered by an opaque masking print. Windshields typically have a surrounding peripheral masking print made of an opaque enamel, serving in particular to protect and visually to conceal the adhesive used for installation of the windshield against UV-radiation. This peripheral masking print is preferably used to also cover the upper edge and the side edge of the functional element, as well as the necessary electrical connections. The sun visor is then advantageously integrated into the appearance of the windshield and only the lower edge is potentially visible to the viewer. Preferably, both the outer pane and the inner pane have a masking print such that through-vision is prevented from both sides.

Figure 2:
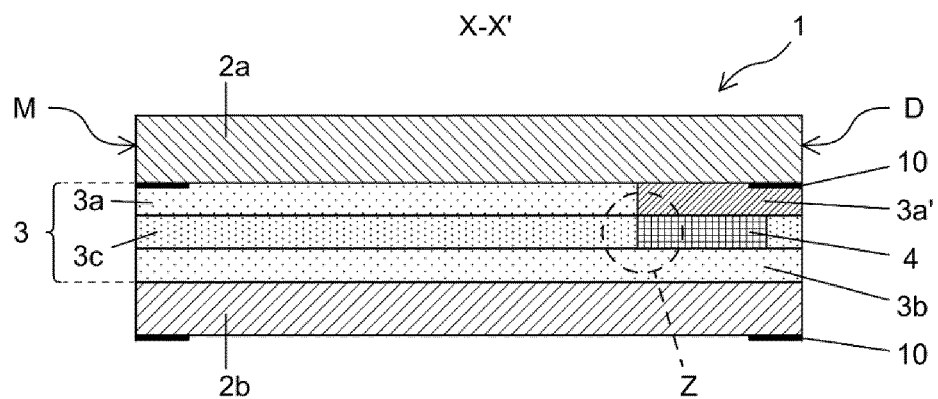
Figure 3:
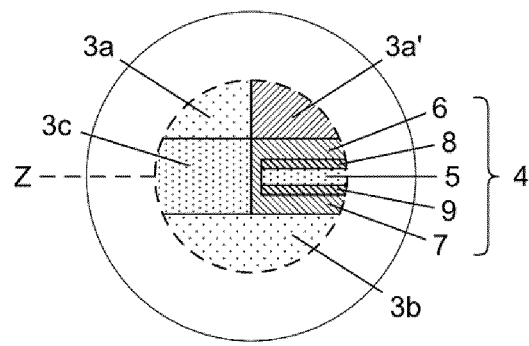
Figure 4:
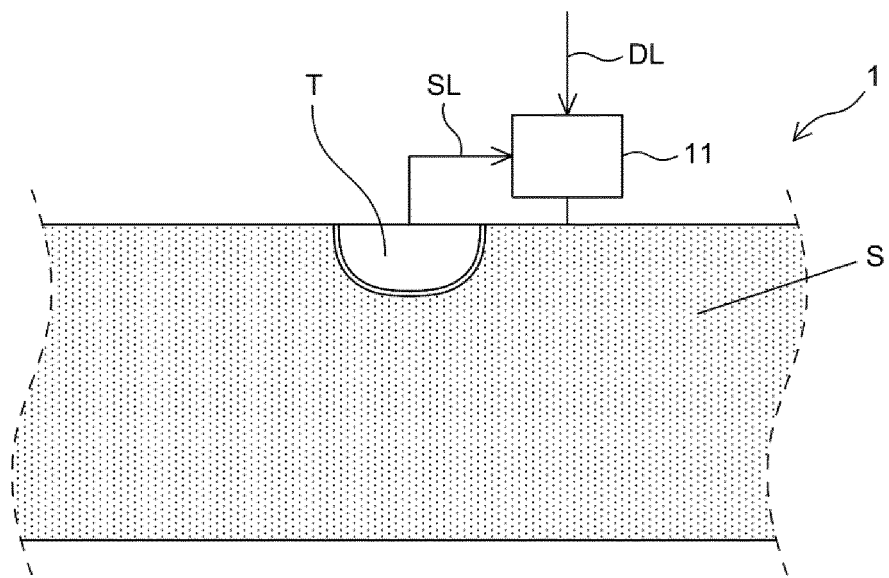
Figure 5:
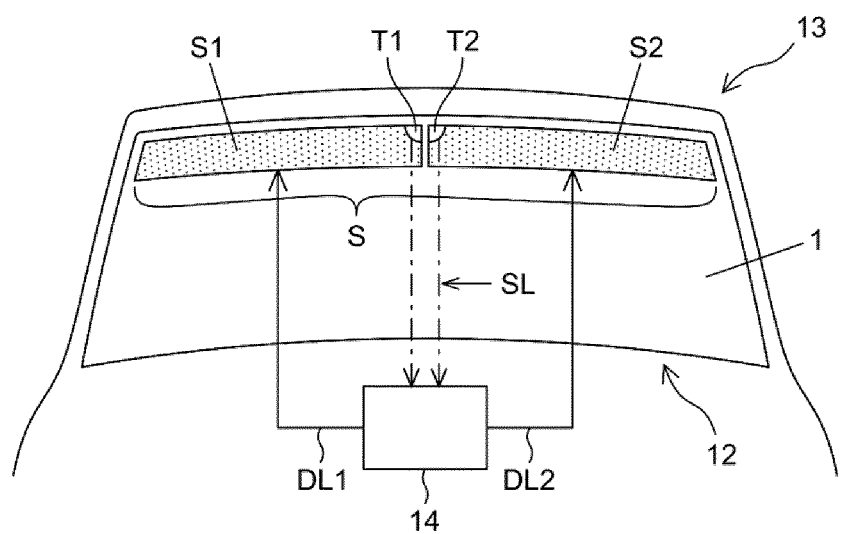

The invention is explained in greater detail with reference to figures and exemplary embodiments. The drawings are schematic representations and not to scale. The figures in no way restrict the invention. They depict:

FIG. 1 a plan view of a first embodiment of the laminated pane according to the invention as a windshield with an electrically controllable sun visor, FIG. 2 a cross-section through the windshield of FIG. 1, and FIG. 3 an enlarged representation of the region Z of FIG. 2, FIG. 4 a detailed view of the windshield of FIG. 1 in a preferred embodiment, and FIG. 5 another windshield according to the invention with a sun visor device, in association with further assembly components of a proposed assembly.

FIG. 1, FIG. 2, and FIG. 3 depict in each case a detail of a windshield with an electrically controllable sun visor, a preferred embodiment of the laminated pane according to the invention with electrically controllable optical properties. The windshield comprises an outer pane 2a and an inner pane 2b joined to one another via an intermediate layer 3. The outer pane 2a has a thickness of 2.1 mm and is made of a green-colored soda lime glass. The inner pane 2b has a thickness of 1.6 mm and is made of a clear soda lime glass. The windshield has an upper edge D facing the roof in the installed position and a lower edge M facing the engine compartment in the installed position.

The windshield 1 is equipped with an electrically controllable sun visor S in a region above the central field of vision B (as defined in ECE-R43). The sun visor S is formed by commercially available PDLC multilayer film as a functional element 4, which is incorporated into the intermediate layer 3. The height of the sun visor is, for example, 21 cm. The intermediate layer 3 includes a total of three thermoplastic layers 3a, 3b, 3c, formed in each case by a thermoplastic film with a thickness of 0.38 mm made of PVB. The first thermoplastic layer 3a is bonded to the outer pane pane 2a, the second thermoplastic layer 3b, to the inner pane 2b. The third thermoplastic layer 3c interposed therebetween has a cutout, into which the cut-to-size PDLC multilayer film is inserted with a substantially precise fit, i.e., roughly flush on all sides. The third thermoplastic layer 3c thus forms, so to speak, a sort of passe-partout for the roughly 0.4-mm-thick functional element 4, which is thus encapsulated all around in thermoplastic material and thus protected.

The first thermoplastic layer 3a has a tinted region 3a' arranged between the functional element 4 and the outer pane 1. The light transmittance of the windshield is, as a result, additionally reduced in the region of the sun visor 4, and the milky appearance of the PDLC functional element 4 in the diffuse state is toned down. The aesthetics of the windshield are thus made significantly more appealing. The first thermoplastic layer 3a has, in the region 3a', for example, an average light transmittance of 30%, with which good results are achieved. The region 3a' can be homogeneously tinted. However, it is often more appealing visually if the tinting decreases in the direction of the lower edge of the functional element 4 such that the tinted and non-tinted regions transition smoothly. In the case depicted, the lower edges of the tinted region 3a' and the PDLC functional element 4 are arranged flush. This is, however, not necessarily the case. It is also possible for the tinted region 3a' to protrude beyond the functional element 4 or, conversely, for the functional element 4 to protrude beyond the tinted region 3 a'

The controllable functional element 4 is a multilayer film, consisting of an active layer 5 between two flat electrodes 8, 9 and two carrier films 6, 7. The active layer 5 contains a polymer matrix with liquid crystals dispersed therein, which align themselves as a function of the electrical voltage applied to the flat electrodes, by which means the optical properties can be controlled. The carrier films 6, 7 are made of PET and have a thickness of, for example, 0.125 mm. The carrier films 6, 7 are provided with a coating of ITO with a thickness of approx. 100 nm facing the active layer 5, forming the flat electrodes 8, 9. The flat electrodes 8, 9 can be connected to the onboard electrical system by means of bus bars (not shown) (for example, a tinned copper strip on a silver-containing screen print) and connecting cables (not shown).

The windshield 1 has, as is customary, a surrounding peripheral masking print 10 formed by an opaque enamel on the interior-side surface (facing the interior of the vehicle in the installed position) of the outer pane 1 and the inner pane 2. The distance of the functional element 4 from the upper edge D and the side edges of the windshield is less than the width of the masking print 10 such that the side edges of the functional element 4—with the exception of the side edge facing the central field of vision B—are concealed by the masking print 10. The electrical connections (not shown) are also expediently installed in the region of the masking print 10 and are thus hidden.

A touch element T according to the invention, with which the function of the sun visor S can be switched, is placed centrally near the upper edge D of the windshield 1 and thus at or near the upper edge of the sun visor S. As stated above, the touch element T is largely formed with the existing structure, as was described above with reference to FIG. 1 through 3. Only (at least) one of the flat electrodes 8, 9 is patterned with a separating line that separates the electrode region of the touch element from the remaining flat electrode of the sun visor, and the electrode region of the switching element T is provided with a signal line (not shown). This can be a very thin signal wire or even a conductor track printed on an interior side of the pane that can lead to the edge of the pane.

FIG. 4 depicts, in sketch form, a central detail of the sun visor region of the windshield 1 of FIG. 1 with the sun visor S and the touch element T arranged at the upper edge enlarged. The figure schematically depicts a signal lead SL that routes a detection signal from the touch element T, specifically, in the embodiment depicted, to an input of a switching and control element 11 of the sun visor S, which, for its part, is connected in a control line DL between a control circuit (not shown here) of the sun visor and the flat electrodes of the sun visor. The switching and control element 11 switches the sun visor ON or OFF (depending on the design of the touch element and the switching and control element) in response to a detection signal from the touch element T and/or, optionally, controls its brightness.

The leads and elements depicted are all implemented within the laminated pane, which makes producing hybrid circuits readily possible by means of conventional metal paste screen printing processes and other known techniques familiar to the person skilled in the art. This embodiment thus represents a laminated pane with a fully integrated actuating and switching or control function of the electro-optical functional element.

FIG. 5 schematically depicts essential elements of a laminated pane assembly 12 according to the invention, comprising a laminated pane 1 of the type described above, in a passenger car 13. Similar to the windshield 1 of FIG. 1 through 4, the windshield 1 depicted here also includes a sun visor S in its upper region. This is, however, implemented here in two parts and comprises a right-side (as viewed by the driver) sun visor section S1 and a left-side sun visor section S2. A touch element T1 or T2 is positioned in each of the two sun visor sections S1, S2, respectively to enable the driver or the front passenger to selectively and intuitively operate the respective sun visor section. As depicted schematically in the figure, the associated signal lines here—in contrast to the embodiment of FIG. 4—are routed out of the laminated pane 1 and (via conventional wiring) to a control circuit 14 of the sun visor S and are used thereto implement separate switching or control functions for the right-side and left-side sun visor section S1 or S2, respectively.

The laminated pane used in the assembly of FIG. 5 is thus not equipped with integrated signal processing electronics, but is formed entirely with conventional glass and multilayer film components, while signal processing and control functions are implemented by the onboard electronics of the passenger car.

Overall, the implementation of the invention is not limited to the aspects highlighted above and examples described above, but is equally possible in a large number of modifications that are within the scope of the appended claims.

REFERENCE CHARACTERS 1 windshield
2a outer pane
2b inner pane
3 thermoplastic intermediate layer
3a first layer of the intermediate layer 3
3a' tinted region of the first layer 3a
3b second layer of the intermediate layer 3
3c third layer of the intermediate layer 3
4 functional element with electrically controllable optical properties
5 active layer of the functional element 4
6 first carrier film of the functional element 4
7 second carrier film of the functional element 4
8, 9 flat electrode of the functional element 4
10 masking print
11 switching and control element
12 laminated pane assembly
13 passenger car
14 control circuit of the electro-optical functional element
B field of vision of the windshield D windshield upper edge
DL control line
M windshield lower edge
S sun visor
S1, S2 sun visor section (functional areas of the functional element)
SL signal lead
X-X' section line
Z detail region

The invention claimed is:

1. A laminated pane with electrically controllable optical properties, comprising an outer pane and an inner pane that are joined to one another via a thermoplastic intermediate layer,
wherein an optoelectronic functional element with electrically controllable optical properties is incorporated into the thermoplastic intermediate layer, the optoelectronic functional element comprising an active layer, to which transparent sheetlike control electrodes are assigned on both surfaces of the active layer, between a first carrier film and a second carrier film,
wherein the thermoplastic intermediate layer, which surrounds the optoelectronic functional element, and the first and second carrier films contain, in each case, thermoplastic material,
wherein at least one capacitive touch element is integrated into the optoelectronic functional element such that a portion of at least one control electrode of the optoelectronic functional element is separated and provided with a signal lead for detecting a capacitive touch or approach signal.

2. The laminated pane according to claim 1, wherein the optoelectronic functional element is a PDLC functional element or an SPD functional element.

3. The laminated pane according to claim 1, wherein the laminated pane is a windshield or a roof glazing of a road vehicle.

4. The laminated pane according to claim 3, wherein the road vehicle is a passenger car.

5. The laminated pane according to claim 1, wherein the laminated pane is a building glazing unit.

6. The laminated pane according to claim 1, comprising an integrated switching or control device, which is placed near the optoelectronic functional element and touch element, which is connected, on an input side, to the signal lead of the touch element and is configured for switching or controlling a function or a parameter of the optoelectronic functional element.

7. The laminated pane according to claim 6, wherein the optoelectronic functional element is designed as a sun visor device and the switching or control device is configured for switching or controlling the sun visor device.

8. The laminated pane according to claim 1, wherein the optoelectronic functional element is configured with full-surface control electrodes using a prefabricated functional multilayer film, and a separating line is later introduced into the functional multilayer film to implement the touch element.

9. The laminated pane according to claim 1, wherein the optoelectronic functional element comprises a plurality of separately controllable functional areas, and a touch element is assigned to at least one part of each of the plurality of separately controllable functional areas.

10. The laminated pane according to claim 9, wherein a touch element for switching or controlling a function or a parameter of the respective functional area is assigned to each of the plurality of separately controllable functional areas of the optoelectronic functional element.

11. A laminated pane assembly, comprising:
a laminated pane according to claim 1, and
a control unit for controlling the optical properties of the electro-optical functional element,
wherein the control unit is connected on an input side to the signal lead of the touch element integrated into the optoelectronic functional element and is designed for switching or controlling a function or a parameter of the optoelectronic functional element as a function of a touch or approach of a finger detected by the touch element.

12. A road vehicle comprising a laminated pane assembly according to claim 11.

13. A building comprising a laminated pane assembly according to claim 11.

14. A road vehicle comprising a laminated pane according to claim 1.

15. A building comprising a laminated pane according to claim 1.

* * * * *